United States Patent
Shiau et al.

(10) Patent No.: US 11,781,699 B2
(45) Date of Patent: Oct. 10, 2023

(54) CRAWLER FOR CONDUIT LINE AND GRADE INSPECTION

(71) Applicants: Shi-En Shiau, Scottsdale, AZ (US); Brian Chia-Huan Shiau, Scottsdale, AZ (US)

(72) Inventors: Shi-En Shiau, Scottsdale, AZ (US); Brian Chia-Huan Shiau, Scottsdale, AZ (US)

( * ) Notice: Subject to any disclaimer, the term of this patent is extended or adjusted under 35 U.S.C. 154(b) by 0 days.

(21) Appl. No.: 17/754,571

(22) PCT Filed: May 19, 2021

(86) PCT No.: PCT/US2021/033086
§ 371 (c)(1),
(2) Date: Apr. 6, 2022

(87) PCT Pub. No.: WO2021/236722
PCT Pub. Date: Nov. 25, 2021

(65) Prior Publication Data
US 2023/0194035 A1    Jun. 22, 2023

Related U.S. Application Data

(60) Provisional application No. 63/101,900, filed on May 21, 2020.

(51) Int. Cl.
*F16L 55/40* (2006.01)
*F16L 55/32* (2006.01)
(Continued)

(52) U.S. Cl.
CPC ............. *F16L 55/40* (2013.01); *F16L 55/32* (2013.01); *G01D 21/02* (2013.01); *F16L 2101/30* (2013.01)

(58) Field of Classification Search
CPC ........ F16L 55/40; F16L 55/32; F16L 2101/30; G01D 21/02
See application file for complete search history.

(56) References Cited

U.S. PATENT DOCUMENTS

| 3,889,116 A | 6/1975 | Gambini et al. |
| 5,172,639 A | 12/1992 | Weisman et al. |

(Continued)

FOREIGN PATENT DOCUMENTS

| CA | 2838608 A1 * | 12/2012 | ......... B23K 37/0276 |
| WO | WO-2015012382 A1 * | 1/2015 | ........... G01C 21/165 |

OTHER PUBLICATIONS

Harry Kim, International Search Report and Written Opinion, PCT application PCT/US/2021/033086 (dated Aug. 23, 2021).

*Primary Examiner* — Herbert K Roberts
*Assistant Examiner* — Anthony W Megna Fuentes
(74) *Attorney, Agent, or Firm* — Venjuris, P.C.

(57) ABSTRACT

The invention is embodied in a crawler that measures alignment, distance, grade, and vertical deflection of underground conduits. The crawler drives through the conduit and collects data that is used to inspect and evaluate whether the construction meets the grade and alignment according to the construction documents and specifications and spot locations of culvert deflections from material defect and/or bedding deficiencies. The preferred crawler is moved into and out of a conduit via remote control. The preferred crawler comprises a deck for carrying electronic sensors, a battery, and other devices. A computer located on the deck communicates with the electronic sensors and the other devices. Most importantly, the preferred crawler comprises at least one wheel that rides on the invert of the conduit. The guide wheel is a key element of the invention because (Continued)

having at least one wheel ride on the invert provides referential location for other measurements.

8 Claims, 9 Drawing Sheets

(51) Int. Cl.
*G01D 21/02* (2006.01)
*F16L 101/30* (2006.01)

(56) References Cited

U.S. PATENT DOCUMENTS

| | | | |
|---|---|---|---|
| 6,035,786 A | 3/2000 | McKay et al. | |
| 2003/0089267 A1 | 5/2003 | Ghorbel et al. | |
| 2019/0009786 A1* | 1/2019 | Liu | B60C 23/02 |

\* cited by examiner

CRAWLER FOR CONDUIT LINE AND GRADE INSPECTION

FIELD OF THE INVENTION

The present invention relates to devices for inspecting conduits. More specifically, this invention relates to crawlers that measure alignment, distance, grade, and vertical deflection of underground conduits (pipelines).

BACKGROUND

A construction project normally involves four parties: an owner, a general contractor, an engineer, and a third-party independent inspector. The construction of underground conduits must meet the design plans and specifications prepared by engineers. After clearing the ground surface, the contractor first dispatches his surveyor to field stake the ground according to the design plan.

The contractor's surveyor stakes the ground offsetting the conduits per instruction as shown on the design plans ("offset stakes"), the contractor can then properly excavate the site along the designated conduit alignment. A typical survey for the gravity conduit installation requires a high degree of accuracy. For example, flowline station staking at ±0.2 feet, alignment at ±0.1 feet, elevation at ±0.01 feet for every 25' along a tangent and 10' along a curve.

Open trench construction is a common practice for conduit installation, particularly in wide-open, undeveloped areas. Construction in well-developed and/or developing areas requires minimal construction impact. The trenches that are dug to place the conduit are normally the width of the conduit's outside diameter plus one foot to each side of the conduit. Therefore, deep and narrow trenches are most desirable. This type of construction makes it more difficult and time consuming to achieve the accurate conduit installation because the contractor must use trench boxes and/or other bracing equipment for safe construction of deep and narrow trenches. See, e.g., FIG. 1.

Conduits made of concrete and metals (except special corrosion resistant stainless-steel alloy) that convey wastewater are vulnerable to corrosion by hydrogen sulfide gas that arises from septic biological waste carried in the wastewater. As a result, PVC and HDPE are the preferred material for pipes due to their ability to withstand corrosion from hydrogen sulfide gas. Likewise, concrete pipes coated with PVC lining, steel pipe lining with epoxy coatings, and clay pipe are also used for conveying wastewater. Nonetheless, low-cost PVC pipes are the most widely used in sewer line installation.

To construct and install a conduit, the contractor's surveyor first stakes the ground at offsets to the conduits as shown on the design plans for the contractor to excavate along the designated conduit alignment with a backhoe and to move the trench box simultaneously. See, e.g. FIG. 2. Trench boxes are available in a few sizes that are limited by the weight and the specific depth of the trench. For a 30-foot-deep trench, three trench boxes must be stacked vertically See, e.g., FIG. 3.

Digging, lowering, and stacking trench boxes are concurrent operations. After digging a trench to the depth set by the offset staking, pipes are installed at the designed elevation and a layer of bedding material is placed and compacted to the pipe spring line elevation (about half the pipe diameter).

In this process, the contractor's surveyor and a third-party surveyor should measure each laid pipe invert immediately after a layer of bedding material is placed and compacted to the pipe spring line elevation before layers of compacted soil fill the trench and cover the conduit. If checking the line and grade does not happen immediately after each new pipe (20' long) is installed, erroneously placed pipes can result finished lines in a pattern of up and down and zigzag due to the nature of the flexible pipes like PVC. Even the most experienced installers may install pipes that deviate from the design plan due to (1) PVC pipe deflection at the joint (201) and (2) PVC pipe flexible longitudinal deflection (202) and PVC pipe vertical deflection (203). For example, pipe joints are flexible for up to 5° deflections. When two pieces of pipe are joined, the flexibility can result up to 8% gradient deviations in 360° directions. A 1% gradient deviation can result in up to 2.4" elevation deviation in a 20' long new pipe installation.

Flexible pipe is available in different stiffnesses which indicate the pipe's ability to resist deflection. However, it's the pipe-soil interaction that is the major structural component of the flexible pipe design. As the load on a flexible pipe increases, it becomes oval with the vertical diameter of the pipe decreasing and the horizontal diameter increasing. This decrease in vertical diameter is termed as the deflection, which is always expressed as a percentage.

Performing the measurements of validating at each pipe installed has major impact to the construction cost and schedule.

The construction cost increase is from the needs of a survey crew on site to measure each pipe invert, which the contractor's pipe installer must pause work to allow the surveyor to take measurements. Not only does this slow down installation, but this also requires the contractor's survey crew to be always on-site. Most contractors cannot afford the cost of a standby survey crew with the project budget. Consequently, contractors take a risk and rely on the pipe installer to make a better effort with/without a laser pointer at laying the pipe according to the offset staking. This is often done without taking measurements after each pipe is laid down to confirm that the pipe's alignment, grade, and other characteristics conform to the design plans.

The project schedule is prolonged from the practice of a third-party inspector verifying the as-built documentation on every pipe section that is installed after a surveyor takes a measurement or, at a minimum, after a pipe installer lays down the pipe. Use of a third-party inspector increases construction timeline and significantly reduces the contractor's daily output. As a result, the inspection of the conduit as built is typically not performed on each pipe installed and often only performed at fixed elevation manholes, which has minimal to no impact on the intermediate pipe construction. As a result, comprehensive measurements of alignment and grade are not performed on every piece of pipe installed. A sewer line if constructed slightly downward or upward can impair the flow characteristics against the conduit designed.

When a contractor suspects such an impairment has occurred, the contractor rarely removes the installed conduit to reinstall the pipe at the correct grade and angle. Instead, the contractor often adjusts the angle or the grade of the remaining pipe to be installed so that it will connect with the next manhole at the correct elevation and location. This results in a conduit of incorrect grades with convexity or concavity that will accumulate waste deposits. At best, this requires frequent and expensive cleaning and maintenance, at worst, it can result in backed up service for the end user and surges at manholes.

Another problem occurs when a utility line is to be relocated and/or a new utility line is to be added. Potential underground conflicts with other utilities and laterals may arise. For, example, when pipe laterals cross underground utilities such as water, sewer, stormwater, cable, gas and other, it is critical to know how the laterals were constructed to avoid conflict with other utilities and where the laterals intersect with the main line.

Locations of utilities can be verified from original design drawings and/or as-built. If as-built drawings are not available, potholing can verify a utility location and elevations. However, potholing service laterals' elevations are quite complicated and costly.

Laterals with great concern and/or uncertainty that may result changes and/or modifications during construction can also be as built by inserting a sonde from the clean out and use dual aerials depth method and/or 70% method. However, this approach only provides 95% accuracy. The errors and deviations are much higher in areas with substantial other utilities.

For construction inspection of a pipeline, various sensors and measurement devices can be loaded on a crawler. Currently, many pipeline inspection crawlers are available. These inspection crawlers focus on the pipeline's structural integrity, whether from deformation and/or corrosion. Although some of these crawlers provide pipeline profiling, but none meets the line and grade construction required inspection. Most advanced crawlers use a laser cone emitter, an image camera that captures the laser cone shape ahead of the crawler to detect ovality changes of the pipe with the millimeter level of accuracy and resolution. This provides good information on the pipe integrity but lacks verification of pipe's constructed line and grade to the design plan.

What is needed is a better way to inspect underground conduit for alignment, distance, grade, and vertical deflection and to assure compliance of as-built construction with design specifications.

SUMMARY OF INVENTION

This invention solves an important pipeline construction quality control issue by providing an accurate and cost saving way to measure the line and grade of an underground conduit constructed without a third-party inspection interrupting construction. The invention provides as-built field data to a third-party inspector so that the third-party inspector can compare the constructed conduit to the design plan's specifications. The invention allows the construction of underground conduits to proceed largely without interruption from the third party inspector.

The invention is embodied in a crawler that measures alignment, distance, grade, and vertical deflection of underground conduits (pipelines). After an underground conduit has been constructed, the crawler is placed in the conduit. The crawler drives through the conduit and collects data that can be used to inspect and evaluate whether the construction meets the grade and alignment according to the construction documents and specifications and spot locations of culvert deflections from material defect and/or bedding deficiencies.

The preferred crawler can be moved into and out of a conduit via remote control. The preferred crawler comprises a deck for carrying electronic sensors, a battery, and other devices. A computer located on the deck communicates with the electronic sensors and the other devices. Most importantly, the preferred crawler comprises at least one wheel (the "guide wheel") that rides on the invert of the conduit. The guide wheel is a key element of the invention because having at least one wheel ride on the invert provides a referential location for other measurements.

The guide wheel is preferably connected to the crawler by a guide wheel assembly mounted to the front of the deck. The guide wheel assembly preferably includes a stem rotatably connected to the deck, a fork connected to a distal end of the stem, and with the guide wheel rotatably connected to the fork as shown in FIG. 8.

The preferred crawler has at least two wheels. In a two-wheel embodiment, it is important that the front wheel (guide wheel) and back wheel (power wheel) are aligned. One way to keep them aligned is to employ a pair of laser alignment devices to indicate when the guide wheel is and is not aligned with the power wheel.

In a five-wheel embodiment (see FIG. 19), it is preferred that the guide wheel assembly is connected to the deck via a spring hinge, wherein the spring hinge is biased to induce rotation of the front support toward the four wheels (i.e., the ground). This keeps the guide wheel traveling on the invert while the four other wheels travel higher up on the conduit walls as shown in FIG. 18.

While a two-wheel crawler and a five-wheel crawler are discussed in more detail below, other wheel combinations can work as long as there is at least one guide wheel and one power wheel. The guide wheel and the power wheel could be the same, but it is preferred to have the guide wheel and power wheel be different.

In order to keep the guide wheel traveling on the invert 39, the preferred crawler uses a first combination of sensors. The first combination of sensors preferably includes a steering motor configured to control the rotation of the stem. Ordinarily, the steering motor would be a stepper motor. In addition, a horizontal proximity sensor is mounted to the deck and configured to check the distance to the conduit sidewall. Preferably, the horizontal proximity sensor is a two-way sensor. That way, the computer can detect when the sidewall distances change and then redirect the crawler back into the center of the conduit.

In order to accumulate spatial data as the crawler moves along the invert, the preferred crawler uses a second combination of sensors. The preferred second combination of sensors include a two-axis inclinometer configured to measure the slope of the conduit, a distance sensor configured to measure the distance traveled by the crawler, a digital compass for measuring the orientation of the crawler, and a vertical proximity sensor configured to measure the distance to an inner top surface of the conduit. In situations where the crawler travels through curves and/or bends that block the distance sensor from reaching the starting point reflector, distance travelled can be measured by a hall sensor on the power wheel. The second combination of sensors enable the crawler to collect X, Y, Z coordinates, distance traveled from the origin, and other data as it passes through the conduit. The collected data is processed, analyzed, and CAD-plotted to provide an accurate comparison of the actual construction to the design plan.

It is important that some elements, like the two-axis inclinometer, can be independently adjusted in the x and y directions. That way, regardless of uneven wear of the crawler wheels and other differences, these elements can be adjusted in the x and y directions relative to the deck. A preferred way to do this is by adding a sensor deck that is connected to the deck by adjustable rods running in the x and y directions. This allows the sensor deck to be leveled in the x and y directions prior to placing it in a conduit.

Three embodiments of this invention are discussed below. The first embodiment is a two-wheel (bicycle-style) embodiment, where the crawler's wheels ride on the pipe invert (direct contact with the invert). The second embodiment is a five-wheel car-style embodiment, where the four wheels of the "car" ride above the pipe invert and the fifth wheel (the guide wheel) rides on the invert. The third embodiment is a snake-style embodiment directed toward locating laterals and other connecting segments.

LIST OF DRAWINGS

DETAILED DESCRIPTION OF THE PREFERRED EMBODIMENTS

A clear understanding of the key features of the invention is referenced to the appended drawings that illustrate the method and system of the invention. It will be understood that such drawings depict preferred embodiments of the invention and, therefore, are not to be considered as limiting its scope regarding other embodiments that the invention is capable of contemplating.

Figure 7:
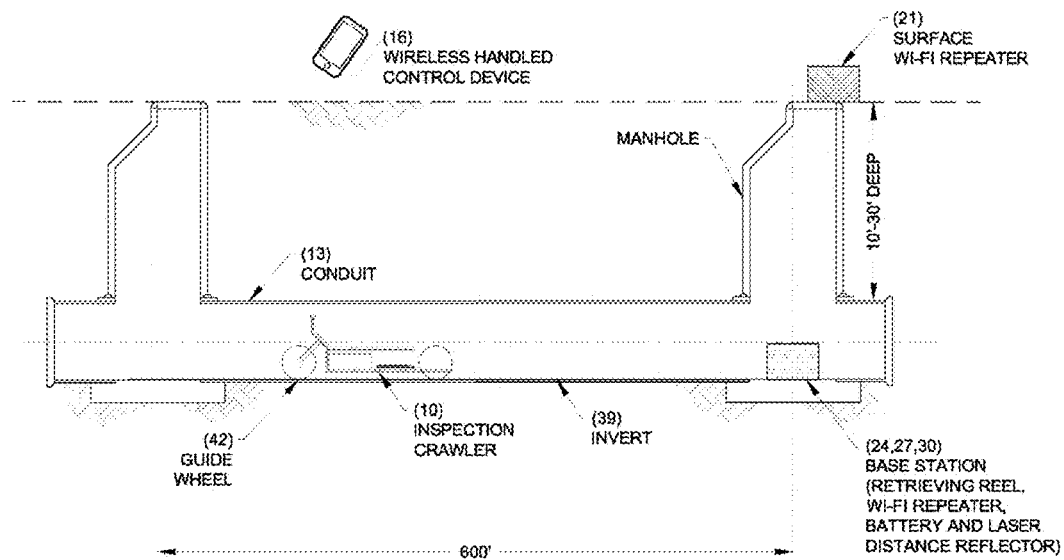
FIG. 7 illustrates a crawler and its base station in operation within a sewer conduit between two manholes. The crawler is remotely monitored and controlled by a handheld controller at the surface.

Broadly, the invention is embodied in a crawler that measures alignment, distance, grade, and vertical deflection of underground conduits (pipelines). The main purpose of the invention is to evaluate whether a constructed underground conduit matches the plans and specifications of the design. Turning now to FIG. 7, the crawler 10 is preferably moved into and out of a conduit 13 via remote control. The remote control device 16 is preferably wireless and could be a smart phone, a dedicated radio frequency (RF) controller, or other similar device. Typically, the remote control device 16 would be used to control the crawler's drive speed (rpm), forward and backward direction of motion, and start and stop motion.

Typically, the remote control device 16 would be in communication with a computer 19, which is carried by the crawler 10. One way to achieve this is through a wireless network, such as wi-fi. Wi-fi can allow the computer 19 to communicate wirelessly with the remote control 16 and/or through one or more repeaters 21. Other wireless networking methods known in the art can also work.

It is preferred that the remote control device 16 receive sensor data, video, and the distance the crawler has travelled, for real-time monitoring. Data is collected by sensors and transmitted to the computer 19 as the crawler moves inside the conduit 13. This information is then transmitted through the base station and the surface Wi-Fi repeater 19 to the wireless handheld device 16 for real time monitoring. In addition, or in the alternative, this data can be transmitted directly to an office computer offsite. The wireless handheld control device 16 can set the crawler 10 to run continuously or to move and stop for set periods. This enables the crawler 10 to collect data while stationary or in motion as required by the inspection.

A base station 24 is preferably positioned at the beginning of the conduit being inspected as shown in FIG. 7. The base station 24 can provide several elements. It can provide a wireless repeater 19, a wireless router, and a battery. It can also provide a retrieving reel 27, which is essentially a winch for retrieving the crawler 10 at any point during the inspection. The retrieving reel 27 could be automatic or manual. Finally, the base station 24 is the preferred place to position a laser distance reflector 30, which is discussed in more detail below. But in short, the laser distance reflector 30 is part of the sensor combination that can determine the crawler's distance from its starting point.

In preferred operation, a user would place a crawler 10 into an underground conduit 13 from a manhole. The crawler 10 drives through the conduit 13 and collects data that can be used to inspect and evaluate whether the construction meets the grade, alignment, and the conduit bedding according to the construction documents and specifications. The crawler 10 collects data and stores it on board and transmits the data to the base station 24 placed inside the manhole. The base station 24 routs data to a surface wi-fi repeater 21 that delivers the data to a wireless handheld control device 16 held by an inspector. The crawler's on-board stored data can be downloaded and plotted later in the office. The as-built plot can be checked against the design plan for certification.

Three embodiments of this invention are discussed in more detail below. The first embodiment is a two-wheel, bicycle-style embodiment, where the crawler's wheels ride on the pipe invert 39 (direct contact with the invert 39). The second embodiment is a car-style embodiment, where a single front wheel rides on the invert and the four wheels of the "car" ride above the pipe invert. The third embodiment is a snake-style embodiment best suited for locating laterals and other connecting segments.

Typically, the two-wheel and five-wheel embodiments are best suited for pipes 8" and larger, and the snake-style embodiment is best suited for pipes smaller than 8". While two-wheel and five-wheel crawlers are discussed in detail below, other wheel combinations can work as long as there is at least one guide wheel that can ride on the invert and one power wheel for controlling forward and back movement. It is preferred that the guide wheel and the power wheel be different wheels, but they could be the same wheel.

Two-Wheel Embodiment

Figure 8:
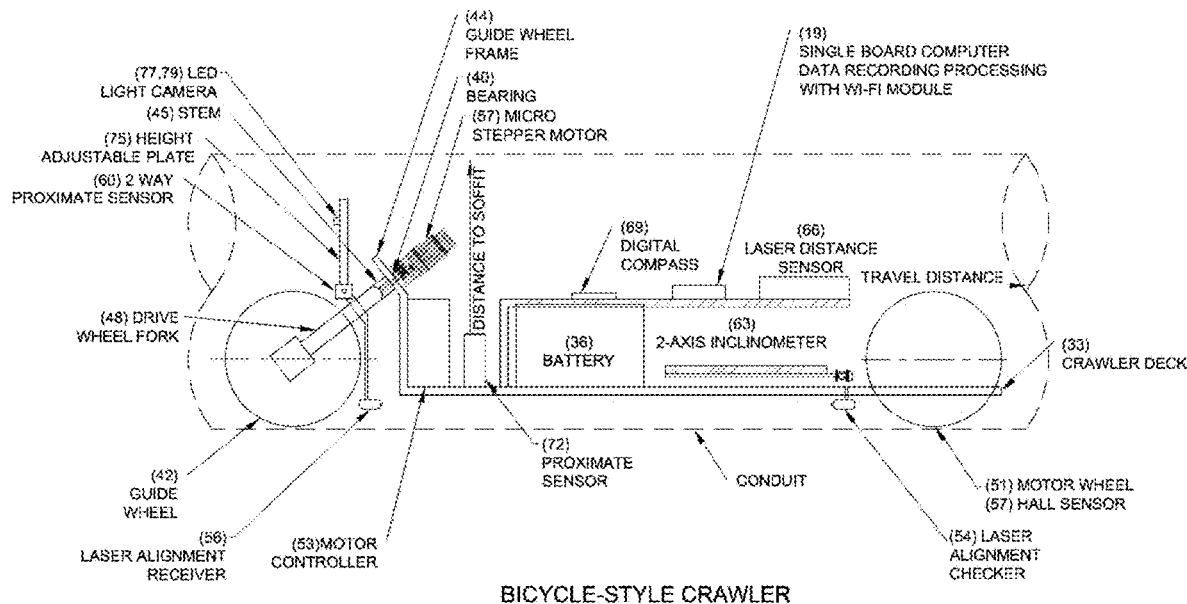
FIG. 8 illustrates controls, sensors, and processors included in a two-wheel bicycle style crawler embodiment.

FIG. 8 illustrates the preferred two-wheel embodiment. As shown, the crawler 10 comprises a deck 33 for carrying electronic sensors, other equipment, and a battery 36. The deck 33 can have multiple levels and walls as needed to house the various equipment. The computer 19 can be positioned on the deck 33 and it can communicate with the electronic sensors and the other equipment. The computer 19 is preferably a "single board computer." Those in the art will recognize that there are many suitable single board computers available that would be suitable in terms of processing power, memory and size. For example, single board computers like those marketed under the name Rasberry Pi zero and PocketBeagle would be suitable.

The preferred crawler 10 comprises at least one wheel (the "guide wheel") that rides on the invert 39 of the conduit. The guide wheel 42 is a key element of the invention because having at least one wheel ride on the invert 39 provides a referential location for other measurements. In addition, keeping the guide wheel 42 on the invert 39 ensures slope readings truly represent the grade constructed. Using other parts of the conduit can provide inaccurate results given that the conduits are often subject to vertical deflection, which results in elliptical or deformed cross-sections.

The guide wheel 42 is preferably part of a larger guide wheel assembly mounted to a front frame 44 of the deck 33. The front frame 44 is a rigid support member connected to the deck 33. The guide wheel assembly preferably includes a stem 45 rotatably connected to the front frame 44 the deck 33, a fork 48 connected to a distal end of the stem, and the guide wheel 42 rotatably connected to the fork 48.

The preferred crawler 10 has at least two wheels. In addition to the guide wheel 42 in the front, there is a power wheel 51 in the back. The power wheel 51 and the guide wheel 42 could be the same wheel, but is it preferred that the guide wheel 42 go in the front with the power wheel 51 in the back. The preferred guide wheel 42 has a 4" (wheel diameter)×2" (tire width). The tires are preferably solid rubber with the curvature of the tire tread matching the arc of an 8" conduit.

The power wheel 51 preferably has a power train comprising a motor, a motor controller 53 and receives power from the battery 36. The preferred motor is a low RPM brushless hub motor. The power wheel 51 moves the crawler 10 in a motion like a motorcycle.

Figure 15:
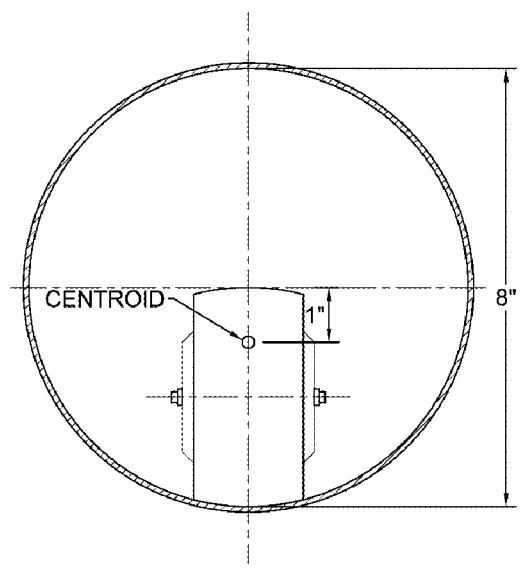
FIGS. 15-16 illustrate how far the crawler can veer off course in the conduit without tipping over.
Figure 16:
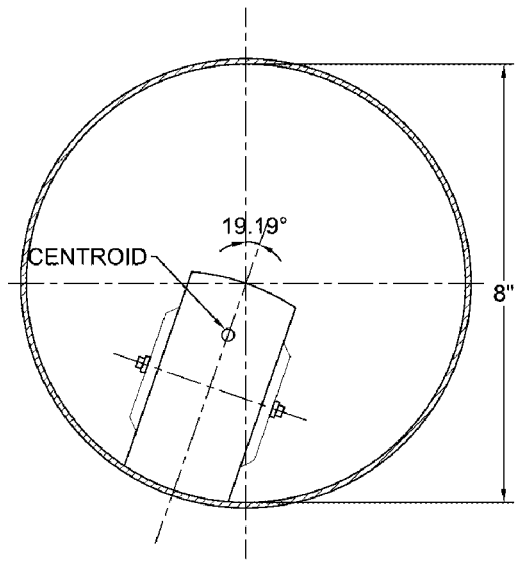
Figure 17:
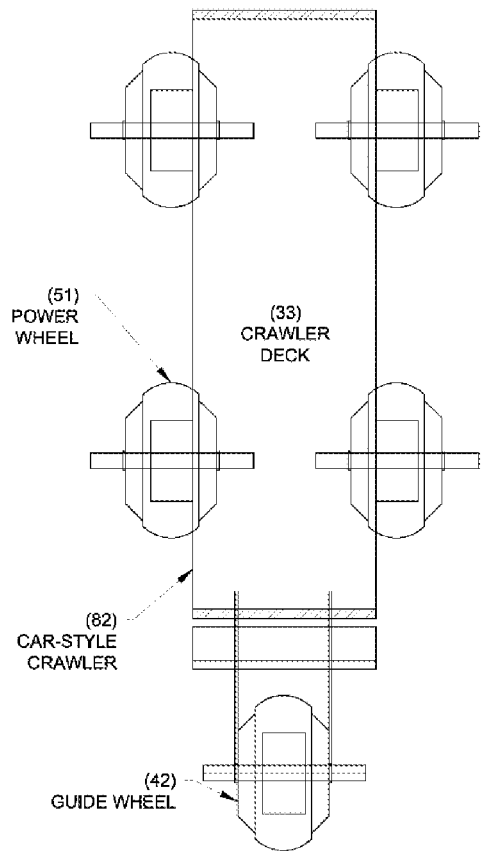
FIGS. 17-19 are schematic diagrams that illustrate how a guide wheel on the invert added to a four and/or more wheels crawler maintains direction with a stepper motor controller.
Figure 18:
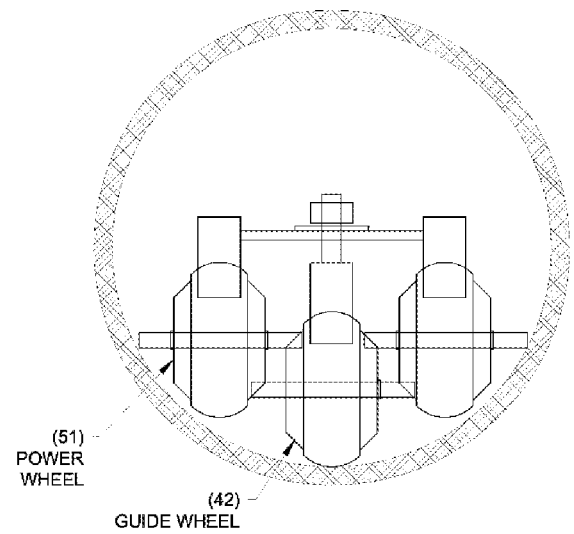

The crawler deck 33 is preferably a 2" wide deck. The deck 33 is preferably located 1" above ground (bottom of the wheel) such that the centroid of the crawler 10 when fully loaded is in the middle of the wheel (2" above ground and 1" from either side such of the wheel that the crawler is in balance) when placed on a culvert invert. In this configuration, the crawler can run on the side of a pipe with a tilt angle up to 19° (FIGS. 15 and 16). For a different crawler deck width and tire width configuration, the centroid position and the tipping angle should be calculated.

In a two-wheel embodiment, it is important that the front wheel (guide wheel 42) and back wheel (power wheel 51) are aligned. One way to accomplish this is to employ a pair of laser alignment devices to indicate when the guide wheel is aligned with the power wheel. FIG. 8 shows a laser alignment emitter 54 connected to the deck 33 near the power wheel 51. A laser alignment receiver 56 is shown connected to the guide wheel assembly. Together, the laser alignment emitter 54 and laser alignment receiver 56 form a pair of laser alignment devices. Other alignment checkers, like a photoelectric checker could also work.

Balance and directional control are handled by the guide wheel 42 that is mounted on a Y-shaped fork 48 that is connected to the guide wheel frame through a 360° bearing 40. The stem 45 of the fork 48 is threaded to a bearing mounted on the crawler frame, allowing the guide wheel 42 to turn freely. A steering motor 57 is also mounted on the crawler frame 34 over the guide wheel 43 with the motor shaft connecting the stem 45 with a threaded coupling.

In order to keep the guide wheel 42 traveling on the invert 39, the preferred crawler 10 uses a first combination of sensors. The first combination of sensors preferably includes a steering motor 57 configured to control the rotation of the stem 45. Preferably, the steering motor 57 would be a sensor-guided stepper motor. An algorithm on the computer 19 would process the sensor data and maintain the gravity centroid balance of the guide wheel 42 and keep it on course down the center of the conduit.

In addition, first combination of sensors would also preferably comprise a horizontal proximity sensor 60. The horizontal proximity sensor 60 is mounted to the deck and configured to check the distance to the conduit sidewall. Preferably, the horizontal proximity sensor 60 is a two-way sensor mounted on an adjustable plate. Using the adjustable plate, the horizontal proximity sensor 60 can be positioned at an elevation of half of the conduit's depth to measure the distance to both side walls. Like the stepper motor, computer 19 tracks the distances to the sidewalls. That way, the computer 19 can detect when the sidewall distances change and then redirect the crawler 10 back onto the invert 39 and thus, the center of the conduit 13.

Alternatively, a pair of bracing wheels like bicycle training wheels can be added to keep the two-wheel crawler 10 upright.

In order to accumulate spatial data as the crawler moves along the invert 39, the preferred crawler 10 uses a second combination of sensors. The preferred second combination of sensors include a two-axis inclinometer 63 configured to measure the slope of the conduit 13, a distance sensor 66 configured to measure the distance traveled by the crawler 10, a digital compass 69 for measuring the orientation of the crawler 10, and a vertical proximity sensor 72 configured to measure the distance to an inner top surface of the conduit.

In cases where the crawler travels through curves and/or bends that block the distance sensor from reaching the starting point reflector 30 on the base station 24, crawler distance travelled can be measured by hall sensor 57 on the power wheel 51. While there are many alternative ways to record distance travelled, it is preferred add a software program to the motor controller 53 to monitor how many times one of the crawler wheel rotates. That way distance travelled can be calculated by multiplying the number of rotations of the wheel by the wheel's perimeter. It is known in the art how to set up a hall sensor to count wheel rotations using a magnet mounted to the wheel.

It is preferred that 2-axis inclinometer 63 (or tilt sensor) be as accurate as possible because its readings affect the resulting X, Y coordinate data. The preferred resolution is at least 0.0002"/ft 05 5 arcsec (0.001° or 0.020 mm/meter) and the preferred accuracy is at least at ±0.0004"/ft or 0.002° from 0° to 0.5° and ±0.004° at other angles. One example of a 2-axis inclinometer that has been found suitable is sold under the name Digi-Pas, DWL-1500XY model or higher.

Together, the second combination of sensors enable the crawler 10 to collect X, Y, Z coordinates, and traveled distance from the origin, and other data as it passes through the conduit. The collected data is processed, analyzed, and CAD-plotted to provide an accurate comparison of the actual construction to the design plan. In addition, this data can also be used for the guide wheel's stepper motor control for aligning the guide wheel and the crawler wheel on the conduit invert.

Figure 1:
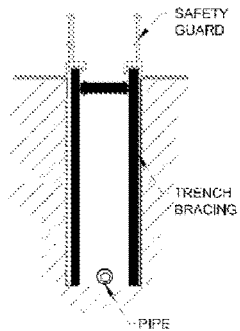
FIG. 1 illustrates a prior art braced deep trench.
Figure 2:
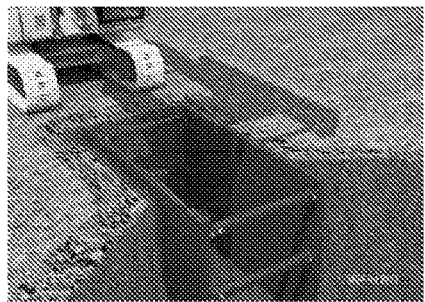
FIG. 2 illustrates a prior art backhoe digging and moving a prior art trench box.
Figure 3:
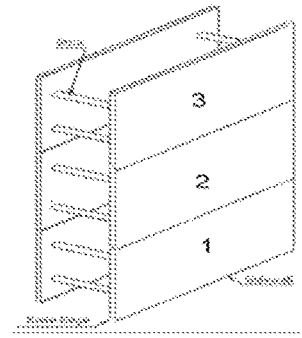
FIG. 3 illustrates three prior art trench boxes stacked on top of each other.
Figure 4:
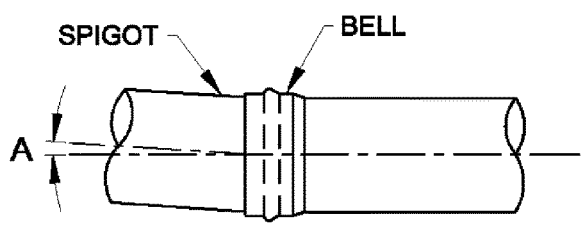
FIG. 4 illustrates an example of prior art axial pipe deflection at a joint.
Figure 5:
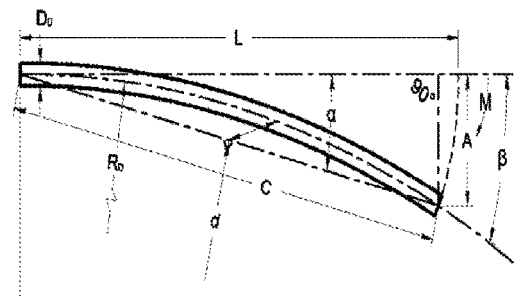
FIG. 5 illustrates an example of prior art longitudinal deflection.
Figure 6:
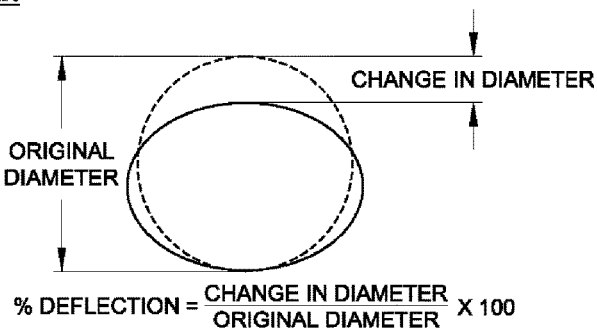
FIG. 6 illustrates an example of vertical pipe deformation from inadequate bedding and backfill.

In addition, the vertical proximity sensor 72 indicates when vertical deflection has occurred. As shown in FIG. 6 vertical deflection of the conduit can occur when the vertical loading has exceeded the design limits. By setting up a vertical proximity sensor 72 and keeping the guide wheel 42 traveling on the invert 39, any reduction in the distance to the soffit of the conduit 13 indicates deflection. This reduction in vertical distance can then be converted to percentage deflection.

Optionally, the crawler 10 can also be outfitted with a video camera 77 and light 79 preferably mounted to the front of the crawler 10.

Car-Style Crawler

In a five-wheel embodiment, it is preferred that the guide wheel assembly is connected to the deck via a torsion spring 80 (or spring hinge), wherein the torsion spring 80 is biased to induce rotation of the front support toward the four wheels. This keeps the guide wheel traveling on the invert while the four other wheels travel higher up on the conduit walls.

A car-style crawler 82 can use the same electronics package as the bicycle-style crawler 10. For example, just like with the two-wheel embodiment, it is preferred to use a micro stepper steering motor 57 to adjust and align the guide wheel 42 and the main deck 33 with the alignment of the conduit invert 39. Likewise, the embodiment of a car-style guide wheel 42, stepper steering motor 57, horizontal proximity sensor 60, LED light and camera, the height adjustable plate and the laser receiver for alignment check are same as a bicycle style crawler. The power train, arrays of instrumentation, and a laser emitter for alignment check are also preferably the same as a bicycle style crawler 10.

One big difference is that the four wheels of the car style crawler 82 do not ride on the pipe inverts 39 (contactless with the pipe invert). Instead, a guide wheel 42 with a long-stem-fork 48 in the front of the crawler 82 rides on the pipe invert 39. This enables direct measurement of the invert and enhances the accuracy of the collected data.

The guide wheel 42 for the car-style crawler 82 is same as the two-wheel crawler 10 except a guide wheel deck frame 44 (or "front frame 44") is preferably connected to the deck 33 by something that induces rotation of the deck frame 44 toward the four wheels (i.e., the ground). That way the guide wheel 42 is biased against the invert 39. This connection can be accomplished in a variety of ways known in the art. It is preferred to connect the guide wheel deck frame 44 to the deck 33 by one or more torsion springs 80. The torsion spring 80 presses the guide wheel 42 against the pipe invert 39 regardless of the pipe sizes while the main deck's multiple wheels are on the curve sides of the conduit 13 and consequently the multiple wheels are higher and above the pipe invert 39.

Keeping the Crawler Embodiments Traveling Along the Centerline of the Conduit

Preferably, a horizontal proximity sensor 60 is mounted on a vertically placed height adjustable plate 75. The sensor 60 should be set at an elevation equal to half of the conduit diameter, but that is not a requirement. It is best if the sensor measures the distances to both sides of the conduit wall. This measurement aids in controlling the guide wheel 42 so that it is aligned with the conduit invert thalweg line.

Figure 9:
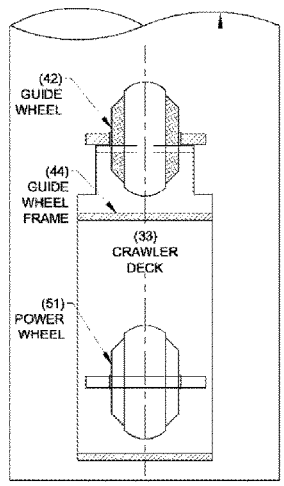
FIGS. 9-14 are illustrations showing how a 2-wheel crawler maintains balance and direction with a stepper motor controller.
Figure 10:
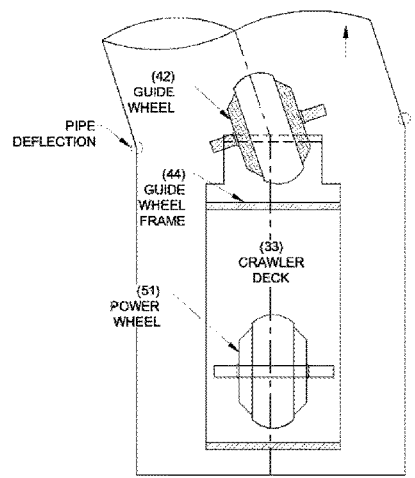
Figure 11:
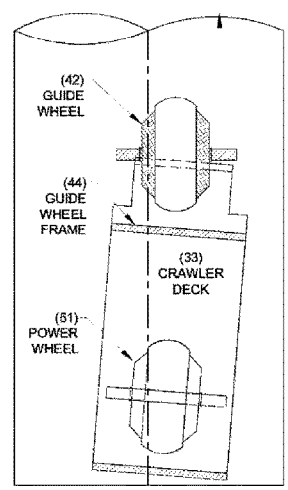
Figure 12:
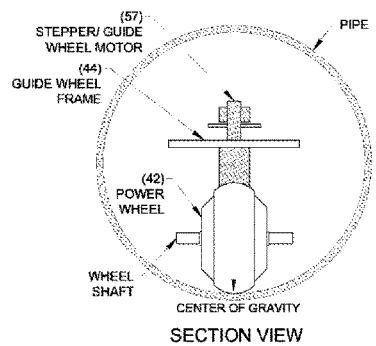
Figure 13:
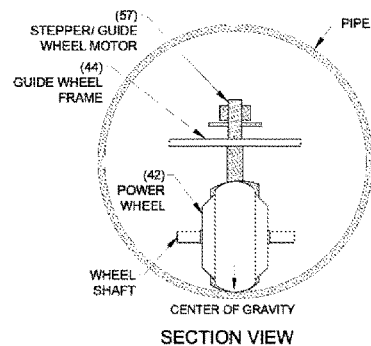
Figure 14:
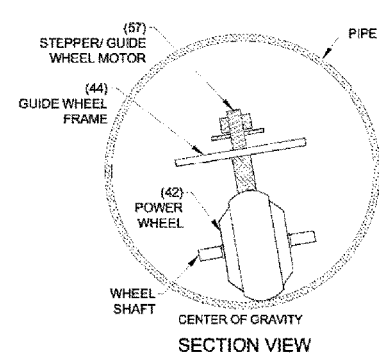

FIG. 9 illustrates the guide wheel 42 and power wheel 51 running on the invert 39 in a straight conduit 13. FIG. 10 illustrates the guide wheel 42 changing direction where the conduit alignment changes. FIG. 11 illustrates the guide wheel 42 pulling the power wheel 51 back toward the invert 39 when the crawler 10 is off the invert 39 of the conduit 13.

The two wheels bicycle-type crawler deck 33 and the guide wheel frame 44 are one-piece unit. The guide wheel is mounted to the unit body through a bearing. In the five wheel car style, the drive wheel frame and the crawler deck are connected by a torsion spring 80.

The 2-axis sensor's y-axis reading indicates the tilt of the crawler deck and the drive wheel hub if any.

The two-way proximity sensor indicates whether the guide wheel is on the invert. The algorithm will constantly compare the difference ($\Delta S$) of the distance of the crawler to the right side wall to the crawler to the left side wall and the tilt angles of the y-axis ($\beta$) of the crawler deck.

Maintaining the balance of the crawler is the priority. It is preferred to use an algorithm is to keep the y-axis ($\beta$) in the horizontal plan at zero. For $\beta > 0$, the crawler deck is off to the left, then the stepper motor is to be turned to right at an angle $\gamma$ equals to micro stepper motor's adjustable unit angle (degrees or minutes per stepper motor specifications) for a travel duration $T = Hb/(v*SIN(\gamma))$, where v is the speed of the motor wheel. The stepper motor will reset the drive wheel stem to the initial position. Likewise for the tilting to the right.

Hc=centroid elevation from the invert

Hb=distance of crawler's centroid line at wheel track to thalweg line $Hb = Hc*TAN(\beta)$ Secondly, an algorithm is used to maintain the drive wheel aligned with the invert thalweg line. For $\Delta S > 0$, the drive wheel is off to the left, then the stepper motor is to be turned to right, at an angle $\alpha$ equal to micro stepper motor's adjustable unit angle (degrees or minutes per stepper motor specifications), for a travel duration $T = \Delta S/(2*v*SIN(\alpha))$, where v is the speed of the motor wheel. The stepper motor will reset the drive wheel stem to the initial position. Likewise for the drive wheel is off to the right.

Example: Algorithm for Adjusting Crawler Deck Balance and the Guide Wheel on the Invert (In Plain Language Not in Machine Language)

Step 1: Start
Step 2: Declare variables
1. x and y of the 2-axis sensor's reading,
   a. x-axis for longitudinal, zero for horizontal level, negative for downhill, positive for uphill; Reading in slope Sxi=Sx1, Sx2, . . . Sxn.
   b. y-axis for lateral, zero for horizontal level, negative for tilting left, positive for tilting to the right; Reading in slope Syi=Sy1, Sy2, . . . Syn.
2. Lr and Ll of the two-way proximity sensor
   a. The algorithm will constantly compare the difference ($\Delta S$) of the distance of the crawler to the right side wall to the crawler to the left side wall and the tilt angles of the y-axis ($\beta$) of the crawler deck.
   b. Conduit diameter Cd
   c. Accuracy in % of the two-way proximity sensor Ap
   d. distance to left wall Ll e. distance to the right wall Lr
f. ΔS=Lr−Ll
g. Input acceptable left wall to right wall deviation in %
h. Define acceptable left to right deviation in length, ΔSok=ABS (Lr−Ll)/Cd*Ap
3. Time
a. Sensor refreshing time Ts (millisecond)
b. Crawler travel time from the begging Ti (millisecond)
c. Algorithm computation check time Tx, initial set equal to 0
d. Duration for stepper motor controlled guide wheel adjustment−Tc
4. Motor wheel
a. Wheel diameter=Dw
b. Power wheel rpm setting
c. Set motor rpm=rpms
d. Adjust power wheel rpm, nrpm=1, 2, 3, . . . , 10; nrpm is the denominator for adjusting rpm as defined by the user
e. speed−v, where v=π*Dw*rpm/60 (unit in fps)
f. motor wheel mode, forward, backward and stop
5. Stepper motor angle γ
a. Γ=0, relates to the original position that the drive wheel and the crawler deck are aligned.
b. Subsequence Γ1, Γ2, . . . Γn stepper motor turning angle.
c. Γmicro, stepper motor's adjustable unit angle (degrees or minutes per stepper motor specifications)
d. #=units of stepper motor turn
6. Crawler Centroid
a. Hc=centroid elevation from the invert
b. Hb=distance of crawler's centroid line at wheel track to thalweg line
c. βok=1°, acceptable y-axis tilt, no stepping motor adjustment will be made if y-axis sensor reading is below this number, the degree is by user's input
d. βtipa=14° or βtips=24.93%, per crawler centroid tipping over calculation; angle in percent=tan(angle in degrees)*100%
7. Crawler location
a. Distance travelled Lti=Lt1, Lt2, . . . Ltn
Step 3: Read variables from sensors and inputs on the single board computer.
WHILE condition (Loop)
Step 4: Check if at conduit bends or conduit curves
4.1 If Ti=Tx or >Tx (Step 5 guide wheel adjustment completed), go to 4.2
Else return to 4.1
4.2 If (Sxi>0 and Sxi-1<0) or (Sxi>0 and Sxi-1<0) go to Step 7
Else
Step 5: Maintain the crawler deck's y-axis in level position.
If ABS (β)<βok, go to Step 6
  Hb=Hc*TAN(β)
  #=INT (β/Γmicro)
  Γ=#*Γmicro
  Tc=Hb/(v*SIN(Γ))
Else
  If β>0, turn micro stepper motor Γ degree to the right.
Else
  If β<0, turn micro stepper motor Γ degree to the left.
then $Tx=Ti+Tc$ Step 6: Maintain the drive wheel align with the invert thalweg line.

6.1 If Ti=Tx or >Tx (Step 5 crawler deck balance adjustment completed) go to 6.2
Else go back to 6.1
6.2 If ABS (β)>βok, go to Step 4

$ΔS=Lr-Ll$ $ΔSok=ABS\ (Lr-Ll)/Cd*Ap$

If ABS(ΔS)<ΔSok, go to Step 5

$Tc=ΔS/(2*v*SIN(Γmicro))$

If ΔS>0, turn the stepper motor Γmicro degree to right,
Else
  If ΔS<0, turn micro stepper motor Γmicro degree to the left.
Else $Tx=Ti+Tc$ ENDWHILE (Go back to step 4)
Step 7—turn guide wheels at bends, curves and reverse grade
At bend, curvature, and reverse grade; where x-axis abrupt changes, (Sxi>0 and Sxi-1<0) or (Sxi>0 and Sxi-1<0)
7.1 Set rpm=0, stop, time stamp Tts=Ti
7.2 Loop right, i=1 to (INT(MaxA/Γmicro)+10)
  turn the stepper motor Γmicro degree to right, read Lr and Ll, ΔSri=Lr−Ll END Loop right
Reset stepper motor to original position 1
7.3 Loop left, i=1 to (INT(MaxA/Γmicro)+10)
  turn the stepper motor Γmicro degree to left, read Lr and Ll, ΔSli=Lr−Ll END Loop left
Find minimum value of (ΔSri and ΔSli)
Set steeper motor to angle corresponding to minimum value of (ΔSri and ΔSli)
Set motor speed to nrpm
proceed crawler forward to Li+3″
If (Sxi>0 and Sxi-1<0) or (Sxi>0 and Sxi-1<0) go to 7.1
ELSE go to 4.1
Step 8: Stop Collecting Conduit Data A single board computer 19 processes data collected from the 2-axial inclinometer 63 and the horizontal proximity sensor 60 and controls the turning of the guide wheel 42 through the steering motor 57.

There are three conditions that are important to get accurate pipe slope measurements from the 2-axis inclinometer 63:

1. For the 2-wheel embodiment, it is critical that the guide wheel and power wheel are aligned. This can be verified via the laser alignment emitter 54 connected to the deck 33 and the laser alignment receiver 56 connected to the guide wheel assembly.
2. For all embodiments, it is critical that the guide wheel travel on the invert 39. This can be verified by the horizontal proximity sensor 60 reading equal distance on both sides of the crawler. Or, if there is only a one way proximity sensor 60, that it is calibrated to a distance that keeps the guide wheel 42 on the invert 39.
3. For all embodiments, it is critical that the y-axis of the inclinometer reads horizontal when the conduit is horizontal. This can be verified by making sure the 2-axis inclinometer 63 is calibrated prior to launching the crawler.

Inclinometer Calibration

The 2-axis inclinometer 63 is factory calibrated. It is preferred to adjust the seating of the 2-axis inclinometer 63 to a (0,0) position as the crawler is standing on flat surface prior to launching the crawler 10. It is preferred that the seating of the 2-axis inclinometer 63 can be independently adjusted in the x and y directions. That way, regardless of uneven wear of the crawler wheels and other differences, these elements can be adjusted in the x and y directions relative to the deck. A preferred way to do this is by adding a sensor deck 83 (seating) that is connected to the crawler deck by adjustable rods running in the x and y directions. This allows the sensor deck to be leveled in the x and y directions prior to placing it in a conduit.

Figure 19:
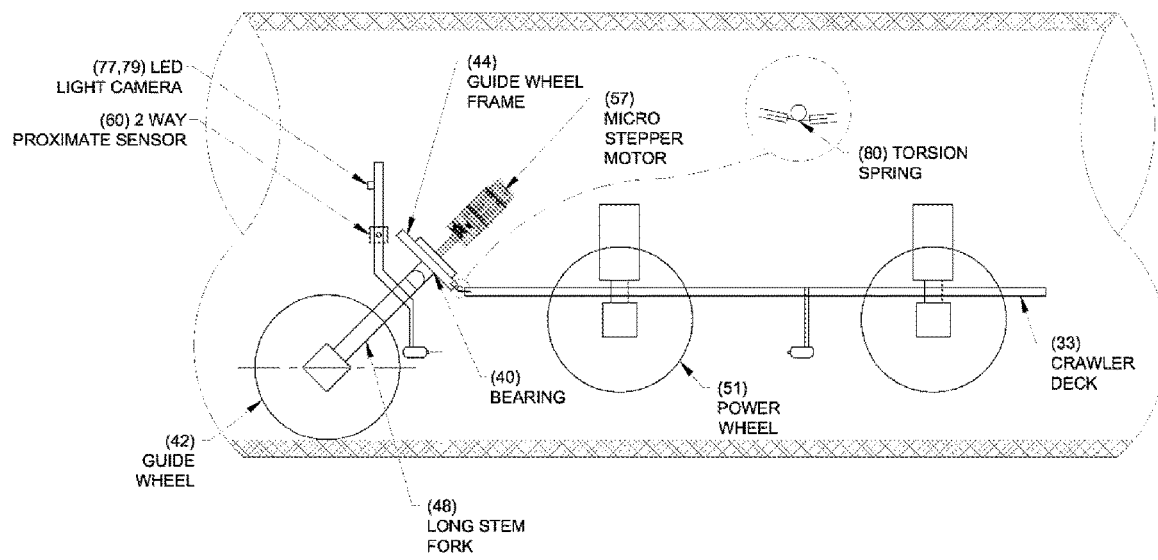
Figure 20:
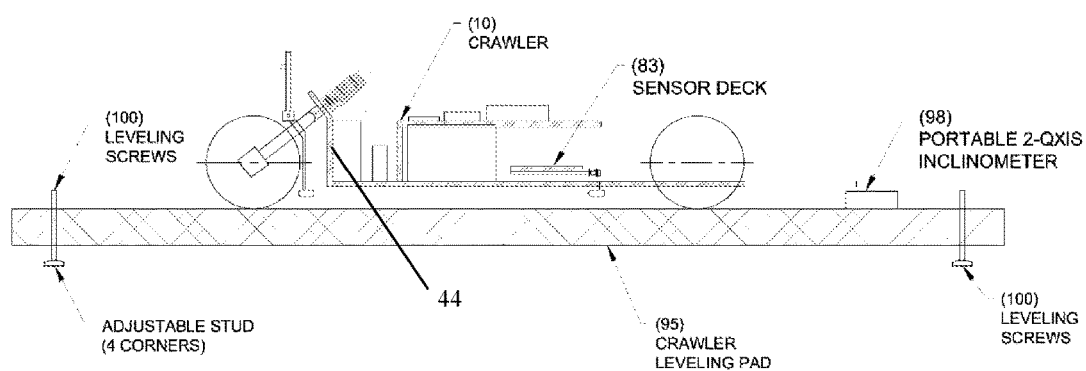
FIGS. 20-23 are schematic diagrams that illustrate the procedures of setting the sensor deck to x axis=0 and y axis=0 positions.
Figure 21:
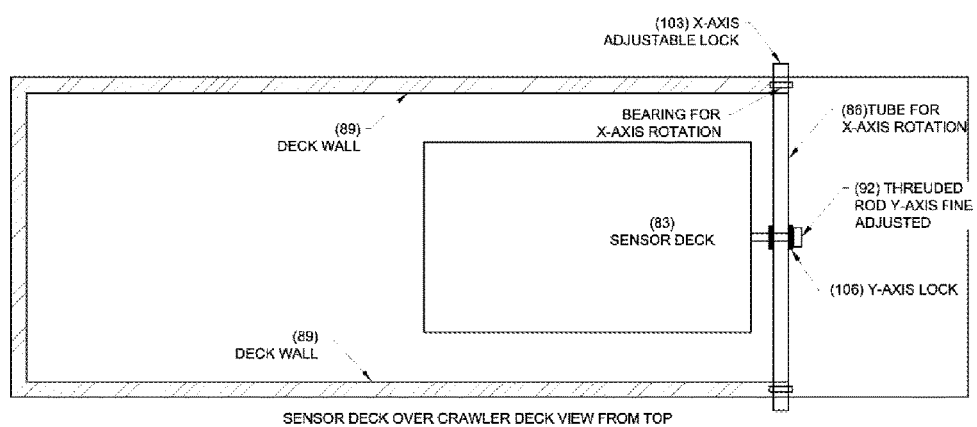
Figure 22:
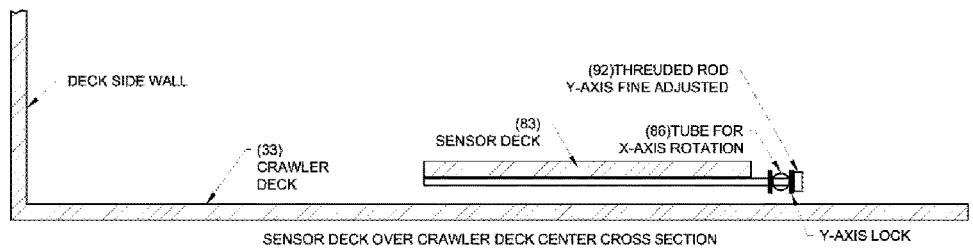
Figure 23:
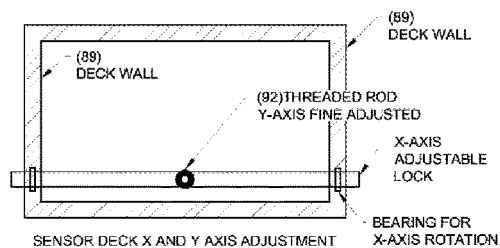

FIGS. 19-21 illustrate one embodiment of a sensor deck 83 that can be independently leveled in both the x and y directions. For the purposes of this specification, the x-axis is the axis transverse to the pipe length and the y-axis is parallel to the pipe length. As shown, an x-direction rod 86 is connected between deck walls 89. A y-direction rod 92 is connected to the x-direction rod 86. Both the x-direction rod 86 and the y-direction rod 92 have at least two modes: a fixed against rotation mode and a rotation mode. These two modes allow a user to respectively rotate the rods until the sensor deck 83 reaches the desired orientation and then fix them against rotation. In this way, the sensor deck 83 can be calibrated prior to launching the crawler 10.

Adjusting sensor deck 83 can be done manually or automatically. The preferred way to manually adjust sensor deck 83 is to first secure the 2-axis inclinometer 63 on the sensor deck 83. Next, then adjust sensor deck X-axis by turning the x-direction tube 86. Once the sensor deck is oriented in the desired position, lock x-axis adjustable lock 103 against rotation. Next, adjust the sensor deck Y-axis by turning the y-direction rod 92. Once the sensor deck is oriented in the desired position, lock y-axis lock 106 against rotation. The x and y direction rods (86, 92) are preferably stainless steel tubes that can be locked in place. For example, tube locks 103 can be mounted on the outside walls 89 of the crawler where x-direction rod 86 can be locked in place. Likewise, a hole in the middle of x-direction rod 86 can house a threaded stainless coupling for fasten the y-direction rod 92 via a bolt end with a cross screwdriver imprint. Thus, a user can use a screwdriver to lock and unlock the y-axis lock (106) of the y-direction rod 92. And a user can use a lockable bolt 103 to manually adjust the sensor deck 83 along the x-axis.

The preferred way to automatically adjust the sensor deck 83 is to a micro stepper motor to lock knob of the y-direction rod 92 and a micro stepper motor to one of the x-axis locks of the x-direction rod 86. An algorithm in the single board computer 19 can read the x and y axis of the 2-D inclinometer during the crawler set up and lock the 2-axis inclinometer in (0,0) position. However, the addition of micro stepper motors may change the position of the crawler's centroid that must be addressed in the guide wheel's micro stepper motor's control algorithm. A sponge can placed between the inclinometer deck and the crawler deck for minimizing vibrations.

Accounting for Uneven Tire Wear and the Metal Expansion and Shrinkage of the Crawler In addition to setting the sensor deck 83, it is preferred to calibrate the crawler 10 in case the wheels have worn unevenly. The preferred way to calibrate the sensor deck 83 is as follows:

1. placing the crawler 10 on a leveling pad 95 as shown in FIG. 20. The leveling pad 95 having a leveling pad inclinometer 98, which is preferably a 2-way inclinometer;
2. adjusting leveling screws 100 until a (0,0) reading on the leveling pad inclinometer 98 is achieved;
3. placing the crawler 10 on calibrated leveling pad 95;
4. adjusting the x-direction rod 86 and y-direction rod 92 until the sensor deck 83 achieves the (0,0) position. In this way, the crawler's 2-axis inclinometer 63 can read the conduit slope regardless of the torn and wear of the crawler's wheels.

Example of Preferred Crawler Use to Acquire Relevant Data (Use Bicycle-Style for Example)

The crawler 10 can be launched from a manhole into the conduit 13. The base station 24 is placed at the bottom of the manhole and a wireless Wi-Fi repeater 21 is placed at the surface next to the manhole such that wireless communication can be relayed to wireless handheld devices 16.

To proceed with an inspection:
1. turn on the crawler 10 either by activating a physical switch on the crawler or wirelessly using the remote-control device 16;
2. turn on the crawler's sensors (which may be automatic when turning on the crawler or a separate switch on the crawler or a setting on the remote-control device);
3. Input data settings, which may include the conduit's diameter, slope, and coordinates as designed, so that the crawler can plot actual data for the as built comparison to the design plan. This data can be stored on the crawler or a separate processing computer;
4. Set the crawler movement (a) continuous or (b) moving with intermediate stops for data collection without moving vibrations;
5. Set the motor wheel rpm and drive direction (forward or backward) to begin moving the crawler.

The crawler traverses the conduit to collect and record data from the onboard sensors, including a digital compass 69 for measuring the orientation of the crawler, a distance sensor 66 for measuring the distance traveled by the crawler 10, a 2-axis inclinometer 63 for measuring the x- and y-axis of the crawler deck and the slope of the conduit 13, a hall sensor 57 measures the rpm of the motorized wheel, and a vertical proximity sensor 72 for measuring the distance between the crawler and the soffit (inner top surface) of the pipe for vertical deflection. A single board computer 19 records and processes the data. An as built of the conduit can be plotted by processing and analyzing the collected data.

Accuracy of the acquired data—depends on:
1. Accuracy of the sensors
2. Alignment of the instrumentation compartment with the conduit invert
3. Vibration of the motorized power wheel
4. Wheel deformation, conduit irregularity, and debris Data collection, processing, and analyzing—the preferred embodiment of the invention contains an array of sensors described herein but are not limited to these sensors. Likewise, an embodiment that contains a limited array of these sensors is also covered by the invention. Sensor data are collected continuously at time stamp as frequent as every 10 ms.

Sensing, verifying and calculating the conduit alignment—the 2-axis inclinometer 63 and the laser distance sensor 66 trace the crawler's orientation and pipe invert slopes.

Conduit Deflection Measurement—A vertical proximity sensor 72 measures distance from the sensor to the conduit soffit, which measures conduit deflection by the following equation.

Conduit deflection=conduit diameter−proximity reading−sensor to cartwheel bottom height The location of the crawler 10 and the distance traveled are measured by one or more devices, including (1) 2-axis inclinometer 63 provides slopes and 2) Laser distance meter 66 measures distance traveled from the origin by the crawler.

On board data storage and processing—single board miniature computer 19 and microprocessor to store and process all sensor data collected.

Visual inspection and recording—A video camera 77 and light 79 can provide video recording and illumination of the conduit while the crawler is traversing the conduit.

The data collected are also stored on the single board computer 19, which can later be downloaded, processed, analyzed, and plotted against the design plan. This enables the third-party inspector to identify locations with deviations and check the accuracy of line and grade specified by the design engineer as well as locations and extent of vertical deflections of the constructed conduit.

It is particularly important to know the locations of other utility mains and sewer, or storm drain laterals. Lateral pipes normally have pipe diameters smaller than 8" and lengths shorter than 100 feet. The slopes of lateral service pipes tend to be steeper and may have substantial point grade and/or horizontal directional changes to accommodate other utility mains.

For working in lateral pipes, it is preferred to scale-down the previously described crawler embodiments. It is preferred to do this by eliminating much of the instrumentation and reducing the wheel diameter to two inches instead of four inches. The preferred scaled-down version uses instrumentation comprising a 2-axis inclinometer 63 (preferably a micro-electromechanical system ("MEM") (0.22 oz), a compass 69 (also preferably MEM (1 oz)), a camera 77 and a light 79. Lateral pipes may be installed with acute horizontal and vertical changes that wireless transmission mostly would not work well. It is preferred to connect the crawler to the base station 24 with a hard-wired power cord and a data cord.

Snake Crawler Embodiment

If a service lateral has vertical and horizontal alignment changes that are too severe for a scaled-down bicycle-style or car-style crawler to operate, a snake-style crawler, such as the ones shown in FIGS. 24-28 can provide as-built details for service laterals.

Figure 24:
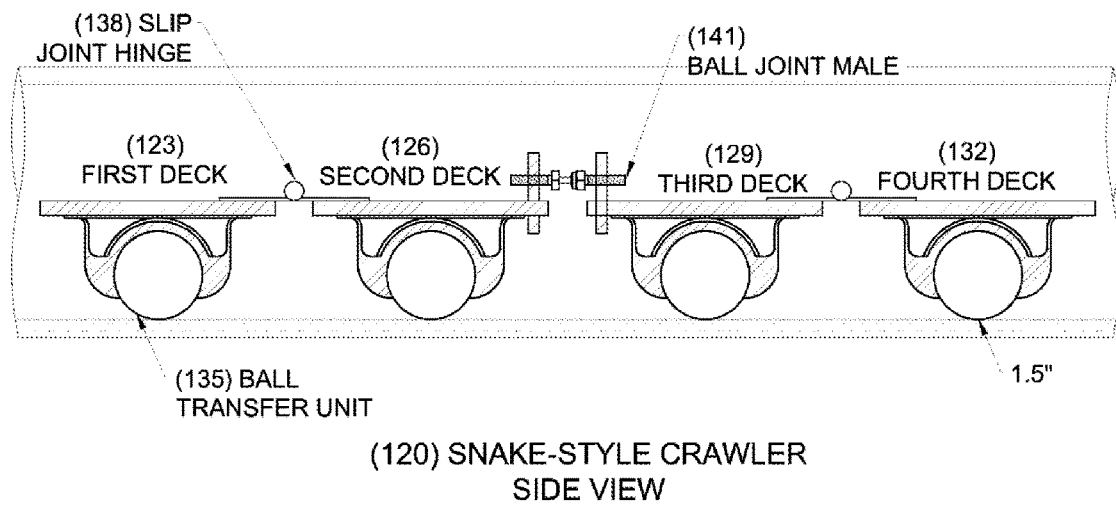
FIGS. 24-25 illustrate a snake crawler embodiment and power assisted snake crawler embodiments.
Figure 25:
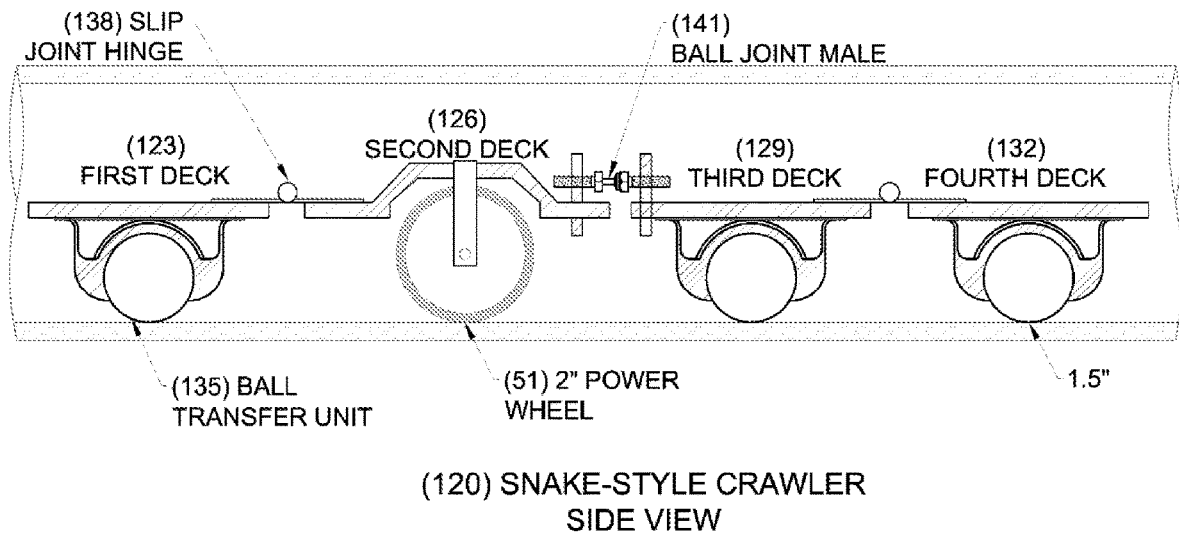

Turning now to FIGS. 24 and 25, the preferred snake-style crawler 120 comprises four independent decks: a first deck 123, a second deck 126, a third deck 129, and a fourth deck 132. Each deck is preferably 3 inches wide. FIG. 24 illustrates an unpowered embodiment and FIG. 25 illustrates a powered embodiment. The unpowered embodiment would be used from the uphill side of the conduit and uses gravity to lower the crawler through the conduit 13. This could be done by connecting a tether to the front end of the crawler 120 and lowering and retrieving the crawler using the tether. The powered embodiment could be used from the downhill side of the conduit 13.

With respect to the unpowered embodiment, the first, second, third and fourth decks (123, 126, 129 and 132) are all supported by an omni-directional roller-ball type caster commonly referred to as a ball transfer unit 135. It is preferred that the ball transfer units employ a 1.5" diameter stainless steel ball and permit omni-directional movement. It is also preferred the ball transfer unit 135 be connected to a two-hole flange for mounting to the underside of the decks.

Figure 28:
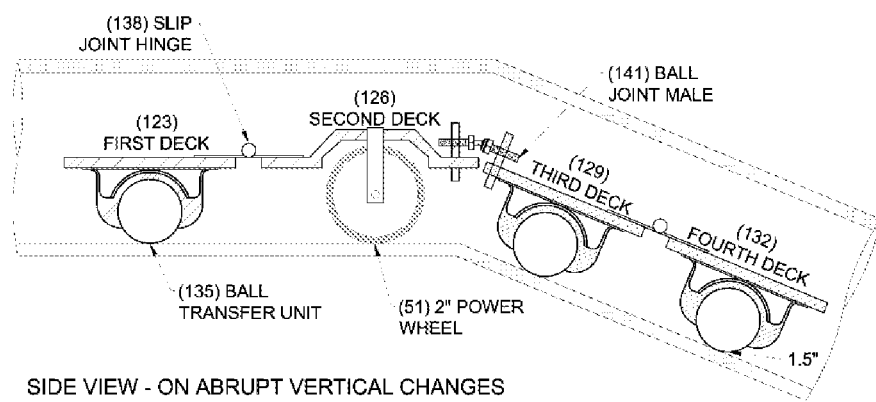
FIG. 28 illustrates a snake crawler embodiment for abrupt vertical changes.
Figure 29:
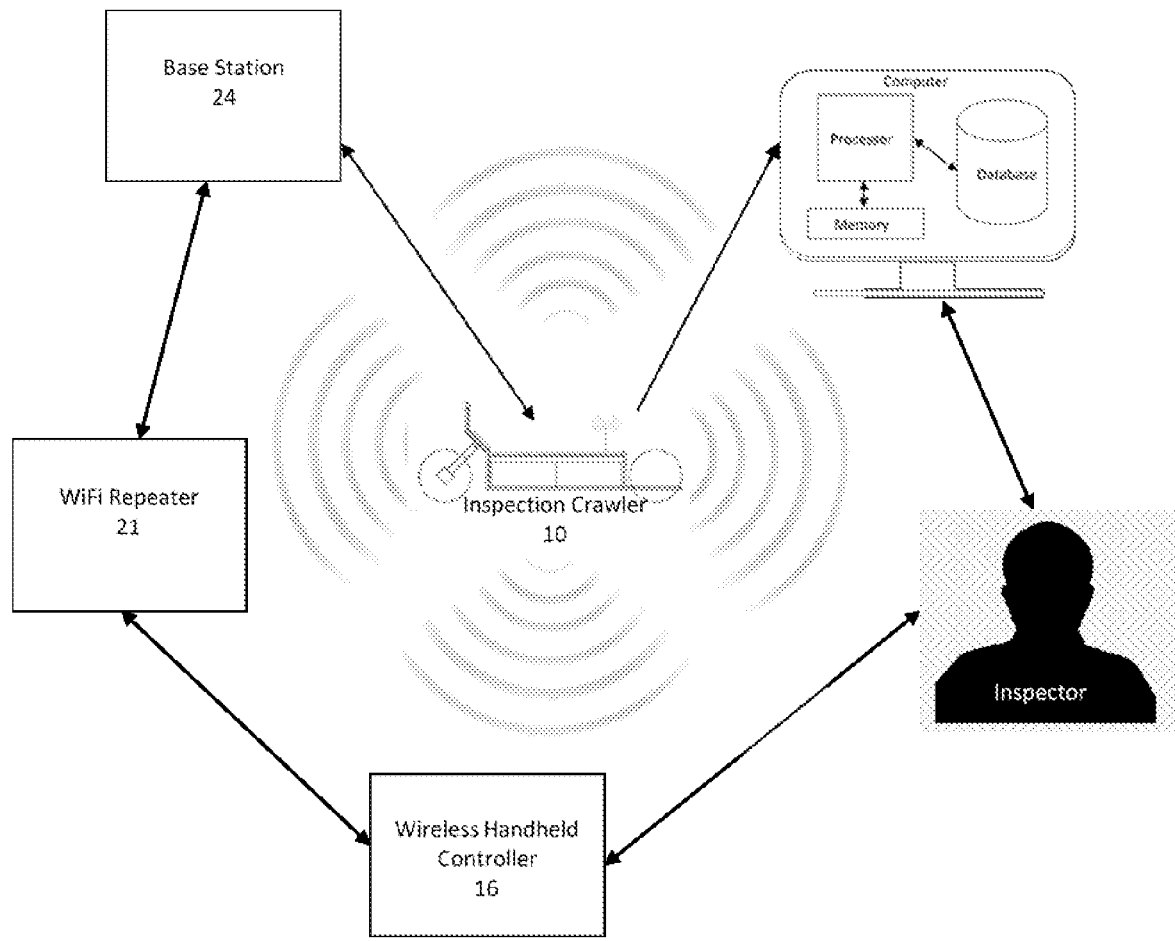
FIG. 29 illustrates an embodiment of system communication.

The first and second decks (123, 126) are preferably connected by a hinge 138 oriented horizontally. Likewise, a hinge 138 also connects the third and fourth decks (129, 132). A slip hinge, preferably plastic, has been found to work well. This hinged connection allows the crawler 120 to move through large vertical changes as shown in FIG. 28.

Figure 27:
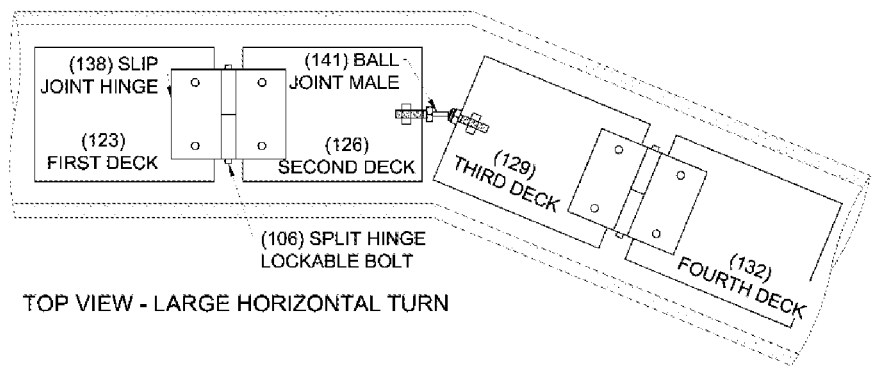
FIG. 27 illustrates a snake crawler embodiment for large horizontal turns.

The second and third decks (126, 129) are preferably connected with a ball joint 141 as shown. The in-line ball joint connection allows up to 45° rotation in all directions, which enables the crawler to move in the horizontal direction along on spot x-y-z axis changes as shown in FIG. 27 as well as the vertical changes shown in FIG. 28. In this way, the crawler can move along with large grade and line changes.

Figure 26:
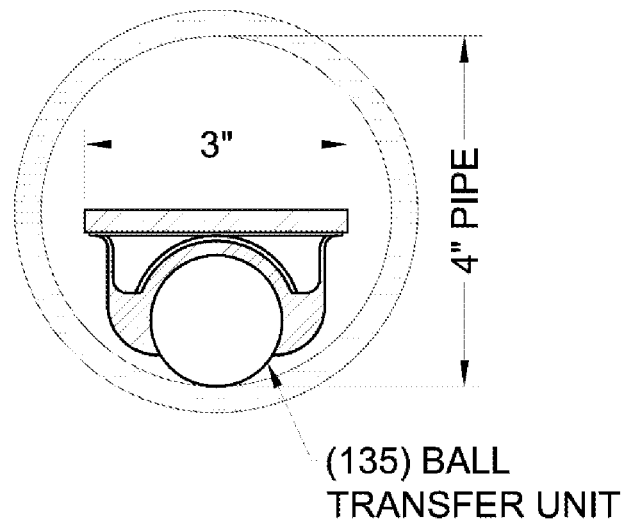
FIG. 26 illustrates a cross-section view of an end of the snake crawler.

The lightweight instruments (which preferably weigh from 1 to 3 ozs) should each be placed centrally on the decks. A 1.5" stainless steel ball weighs 8 oz, so the centroid of the ball mounted flange keeps the ball on the circular lateral's invert without the risk of overturning or upside down as shown in FIG. 26.

In the powered embodiment, the second deck 126 is supported by a power wheel 51 instead of a ball transfer unit 135. It is preferred to use a mono brushless hub motor wheel.

The snake-style crawler base station 24 is similar to the base station 24 of the bicycle-style crawler. It can include a power retrieving reel 27 for retrieving the crawler, a Wi-Fi transmitter for transmitting data to wireless handheld control devices, and other items mentioned above. However, for the snake-style crawler 120, it is preferred not to put the battery 36 on the crawler itself. Rather, the battery 36 can be located in the base station 24 and connected to the crawler's 120 electronic components and power wheel 51 via a power cord.

It is preferred to equip the snake-style crawler 120 with a single board computer 19, a camera 77, a light 79, a micro-electromechanical system ("MEM") 2-axis inclinometer 63, a MEMs compass 69 and a line length measuring mechanism. It is preferred that the line length measuring system be a digital line length measuring system. An example of such a system is sold under the trademark Rapala Digital Line Counert. But other systems will work as long as they can identify how far away the crawler 120 is from the starting position. These items are mounted on the decks (123, 126, 129, 132). These electronic components can be connected to the base station 24 at the service inlet with a power cord and a data cord.

The present invention enables cost-effective quality control of conduit installation against design specifications. The invention enables the enforcement of construction quality that is required under conventional and current practice, minimizing construction delays and costs, reduces uncertainty, and mitigation of dispute risk arising from construction that deviates from the contract.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of this invention.

What is claimed is:

1. A crawler for inspecting a conduit, the crawler comprising,
a deck comprising a horizontal platform and a front support member,
a power wheel rotatably connected to a rear of the deck,
a guide wheel assembly connected to the front support member, the guide wheel assembly comprising
a stem rotatably connected to the front support member,
a fork connected to a distal end of the stem,
a guide wheel rotatably connected to the fork,
a steering motor configured to control the rotation of the stem,
a computer supported by the deck, the computer comprising a processor and a memory, the computer configured to record data and communicate with a base station;
a horizontal proximity sensor configured to check a sidewall distance, wherein the guide wheel is kept traveling on the invert of the conduit based on the outputs from the horizontal proximity sensor,
a horizontal proximity sensor configured to determine a sidewall distance, wherein the guide wheel is kept traveling on the invert of the conduit based on the output from the horizontal proximity sensor, the horizontal proximity sensor in communication with the computer,
a combination of sensors configured to accumulate spatial data as the crawler moves along the invert, the combination of sensors supported by the deck and connected to the computer the combination of sensors comprising,
a two-axis inclinometer configured to measure the slope of the conduit,
a distance sensor configured to measure the distance traveled by the crawler,
a digital compass configured to measure the orientation of the crawler,
a vertical proximity sensor configured to measure the distance to an inner top surface of the conduit,
a battery configured to power the power wheel, the computer, the horizontal proximity sensor and the combination of sensors.

2. The crawler of claim 1, wherein the guide wheel and power wheel travel on an invert of a conduit at the same time.

3. The crawler of claim 1, the crawler further comprising a first laser alignment unit mounted to guide wheel assembly and second laser alignment unit mounted to the deck, the first and second laser alignment units connected to the computer and oriented to indicate when the guide wheel is aligned with the power wheel.

4. The crawler of claim 1, wherein the horizontal platform is supported by four wheels rotatably connected to the horizontal platform.

5. The crawler of claim 4, wherein the front support member is connected to the horizontal platform via a spring hinge, the spring hinge biased to induce rotation of the front support toward the four wheels.

6. The crawler of claim 1, further comprising a sensor deck mounted to the deck, the sensor deck adjustable in an x-direction and a y-direction.

7. The crawler of claim 6, wherein a y-direction rod is connected between the sensor deck and an x-direction rod, the x-direction rod rotatably connected to opposing deck walls.

8. The crawler of claim 7, wherein the y-direction rod permits rotation of the sensor deck relative to the x-direction rod.

* * * * *